United States Patent
Gao et al.

(10) Patent No.: US 11,847,033 B1
(45) Date of Patent: Dec. 19, 2023

(54) LIMITING BLAST RADIUS FOR CRITICAL ON-DISK DATA CORRUPTIONS IN A DISTRIBUTED STORAGE SYSTEM

(71) Applicant: VMware, Inc., Palo Alto, CA (US)

(72) Inventors: Junlong Gao, San Jose, CA (US); Kevin Rayfeng Li, Palo Alto, CA (US); Wenguang Wang, Santa Clara, CA (US); Eric Knauft, San Francisco, CA (US); Pascal Renauld, Palo Alto, CA (US); Quanxing Liu, Mountain View, CA (US); Satish Pudi, Saratoga, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/897,178

(22) Filed: Aug. 28, 2022

(51) Int. Cl.
  *G06F 11/00* (2006.01)
  *G06F 11/20* (2006.01)
  *G06F 11/16* (2006.01)

(52) U.S. Cl.
  CPC ...... *G06F 11/2017* (2013.01); *G06F 11/1662* (2013.01); *G06F 11/2097* (2013.01)

(58) Field of Classification Search
  CPC ............. G06F 11/2017; G06F 11/1662; G06F 11/2097; G06F 11/0727; G06F 11/1458; G06F 11/3034; G06F 11/3006
  See application file for complete search history.

(56) References Cited

U.S. PATENT DOCUMENTS

| | | | |
|---|---|---|---|
| 11,593,212 B1* | 2/2023 | Aya | G06F 16/2365 |
| 2020/0020398 A1* | 1/2020 | Miller | G06F 3/0653 |
| 2020/0226035 A1* | 7/2020 | Li | G06F 11/1446 |
| 2022/0035714 A1* | 2/2022 | Schultz | G06F 11/1438 |

OTHER PUBLICATIONS

Ramachandran. "Limit the blast radius—System design for failures series." InterviewNoodle https://interviewnoodle.com/limit-the-blast-radius-system-design-for-failures-series-51622562c35b (downloaded Dec. 13, 2022).

* cited by examiner

*Primary Examiner* — Joseph D Manoskey
(74) *Attorney, Agent, or Firm* — LOZA & LOZA, LLP

(57) ABSTRACT

System and method for managing distributed storage objects for host unavailability in a distributed storage system uses at least one of a crash indicator in a specific on-disk block and a paused object indicator for a distributed storage object to determine whether to perform data recovery for the distributed storage object. When the crash indicator is set or the paused object indicator implies that the distributed storage object is a paused object, the distributed storage object is left as a paused object without perform the data recovery for the distributed storage object. When the crash indicator is unset and the paused object indicator implies that the distributed storage object is not a paused object, the data recovery for the distributed storage object is performed.

20 Claims, 9 Drawing Sheets

LIMITING BLAST RADIUS FOR CRITICAL ON-DISK DATA CORRUPTIONS IN A DISTRIBUTED STORAGE SYSTEM

BACKGROUND

A distributed storage system allows a cluster of host computers to aggregate local storage devices, which may be located in or attached to each host computer, to create a single and shared pool of storage. This pool of storage is accessible by all host computers in the cluster, including any virtualized instances running on the host computers, such as virtual machines. Because the shared local storage devices that make up the pool of storage may have different performance characteristics, such as capacity, input/output per second (IOPS) capabilities, etc., usage of such shared local storage devices to store data may be distributed among the virtual machines based on the needs of each given virtual machine.

This approach provides enterprises with cost-effective performance. For instance, distributed storage using pooled local storage devices is inexpensive, highly scalable, and relatively simple to manage. Because such distributed storage can use commodity storage devices, e.g., disk drives, in the cluster, enterprises do not need to invest in additional storage infrastructure.

In a distributed storage system, distributed volumes may be used to store the volumes and replicas across many host computers or nodes in a cluster. Each distributed volume is associated with a leader in one node, which has the ability to place incoming data for the distributed volume access other nodes according to a storage policy. When a leader crashes or otherwise becomes unavailable, another node in the cluster is selected to take over the role of the leader. If the reason for the original leader's unavailability is an on-disk corruption that causes the node to crash during data recovery, this could lead to a secondary crash when the new leader attempts to read the data, eventually cascading to all nodes in the cluster. This can have a large blast radius for distributed systems implemented in the kernel, as each failure will crash the kernel. Additionally, this makes diagnosing the original cause for failure difficult, as access to the live system is lost.

BRIEF DESCRIPTION OF THE DRAWINGS

Throughout the description, similar reference numbers may be used to identify similar elements.

DETAILED DESCRIPTION

Figure 1:
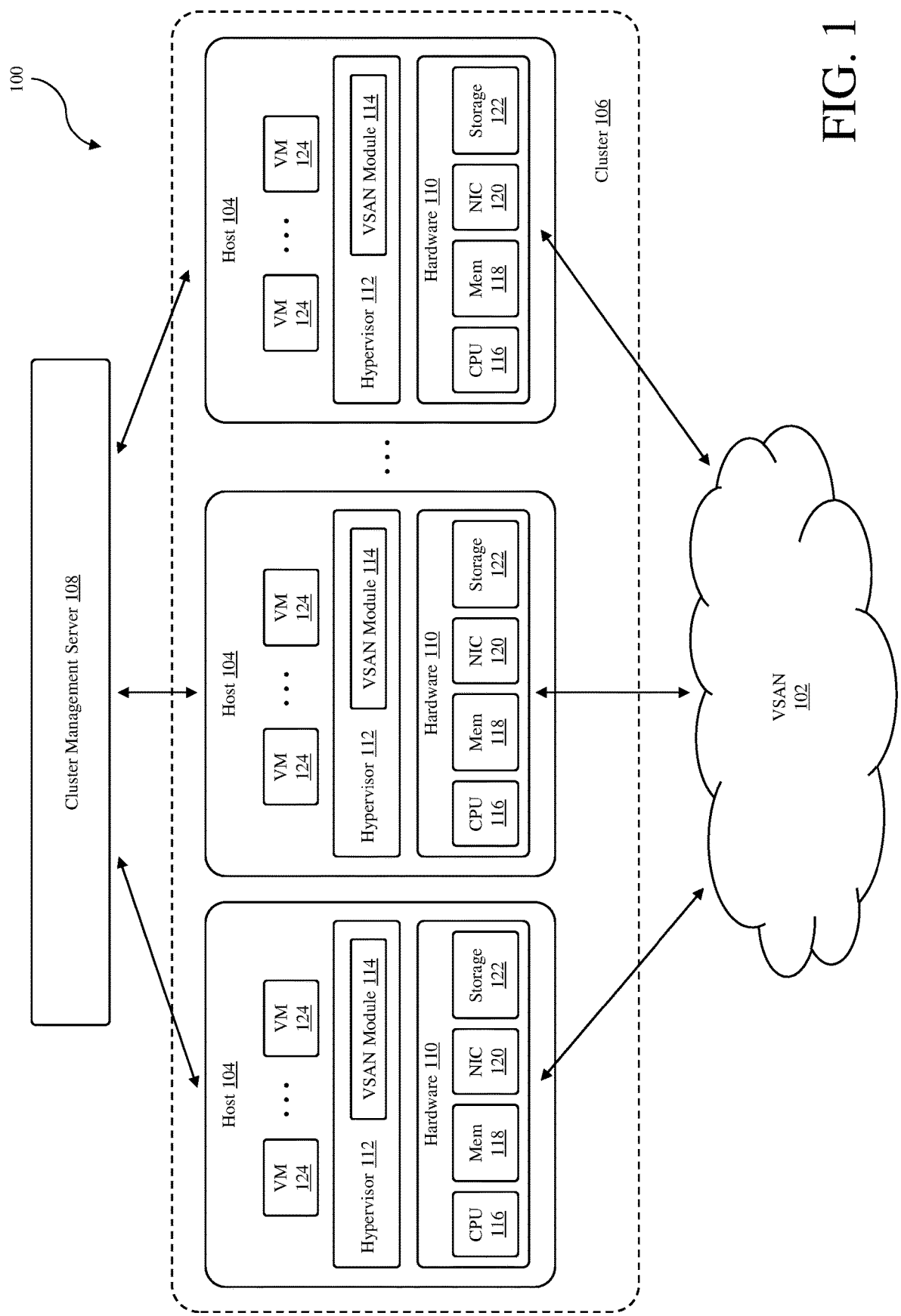
FIG. 1 is a block diagram of a distributed storage system in accordance with an embodiment of the invention.

FIG. 1 illustrates a distributed storage system 100 in accordance with an embodiment of the invention. As shown in FIG. 1, the distributed storage system 100 provides a software-based "virtual storage area network" (VSAN) 102 that leverages local storage resources of host computers 104, which are part of a logically defined cluster 106 of host computers that is managed by a cluster management server 108. The VSAN 102 allows local storage resources of the host computers 104 to be aggregated to form a shared pool of storage resources, which allows the host computers 104, including any software entities running on the host computers, to use the shared storage resources.

The cluster management server 108 operates to manage and monitor the cluster 106 of host computers. The cluster management server may be configured to allow an administrator to create the cluster 106, add host computers to the cluster and delete host computers from the cluster. The cluster management server may also be configured to allow an administrator to change settings or parameters of the host computers in the cluster regarding the VSAN 102, which is formed using the local storage resources of the host computers in the cluster. The cluster management server may further be configured to monitor the current configurations of the host computers and any virtual instances running on the host computers, for example, virtual machines (VMs). The monitored configurations may include hardware configuration of each of the host computers and software configurations of each of the host computers. The monitored configurations may also include virtual instance hosting information, i.e., which virtual instances (e.g., VMs) are hosted or running on which host computers. The monitored configurations may also include information regarding the virtual instances running on the different host computers in the cluster.

The cluster management server 108 may also perform operations to manage the virtual instances and the host computers 104 in the cluster 106. As an example, the cluster management server may be configured to perform various resource management operations for the cluster, including virtual instance placement operations for either initial placement of virtual instances and/or load balancing. The process for initial placement of virtual instances, such as VMs, may involve selecting suitable host computers for placement of the virtual instances based on, for example, memory and CPU requirements of the virtual instances, the current memory and CPU loads on all the host computers in the cluster and the memory and CPU capacity of all the host computers in the cluster.

In some embodiments, the cluster management server 108 may be a physical computer. In other embodiments, the cluster management server may be implemented as one or more software programs running on one or more physical computers, such as the host computers 104 in the cluster 106, or running on one or more virtual machines, which may be hosted on any host computers. In an implementation, the cluster management server is a VMware vCenter™ server with at least some of the features available for such a server.

As illustrated in FIG. 1, each host computer 104 in the cluster 106 includes hardware 110, a hypervisor 112, and a VSAN module 114. The hardware 110 of each host computer includes hardware components commonly found in a physical computer system, such as one or more processors 116, one or more system memories 118, one or more network interfaces 120 and one or more local storage devices 122 (collectively referred to herein as "local storage"). Each processor 116 can be any type of a processor, such as a central processing unit (CPU) commonly found in a server. In some embodiments, each processor may be a multi-core processor, and thus, includes multiple independent processing units or cores. Each system memory 118, which may be random access memory (RAM), is the volatile memory of the host computer 104. The network interface 120 is an interface that allows the host computer to communicate with a network, such as the Internet. As an example, the network interface may be a network adapter. Each local storage device 122 is a nonvolatile storage, which may be, for example, a solid-state drive (SSD) or a magnetic disk.

The hypervisor 112 of each host computer 104, which is a software interface layer that, using virtualization technology, enables sharing of the hardware resources of the host computer by virtual instances 124, such as VMs, running on the host computer. With the support of the hypervisor, the VMs provide isolated execution spaces for guest software.

The VSAN module 114 of each host computer 104 provides access to the local storage resources of that host computer (e.g., handle storage input/output (I/O) operations to data objects stored in the local storage resources as part of the VSAN 102) by other host computers 104 in the cluster 106 or any software entities, such as VMs 124, running on the host computers in the cluster. As an example, the VSAN module of each host computer allows any VM running on any of the host computers in the cluster to access data stored in the local storage resources of that host computer, which may include virtual disks (or portions thereof) of VMs running on any of the host computers and other related files of those VMs. In addition to these VM I/Os, the VSAN module may handle other types of storage I/Os, such as namespace I/Os, recovery or resynchronization (resync) I/Os, and internal metadata I/O. Namespace I/Os are writes and read operations for configuration files for VMs, such as vmx files, log files, digest files and memory snapshots. Resync I/Os are writes and read operations for data related to failed disks, host computers, racks or clusters. Internal metadata I/Os are writes and read operations that are performed on internal data structures other than actual data, such as operations to read from logs, bitmaps, or policies.

Figure 2:
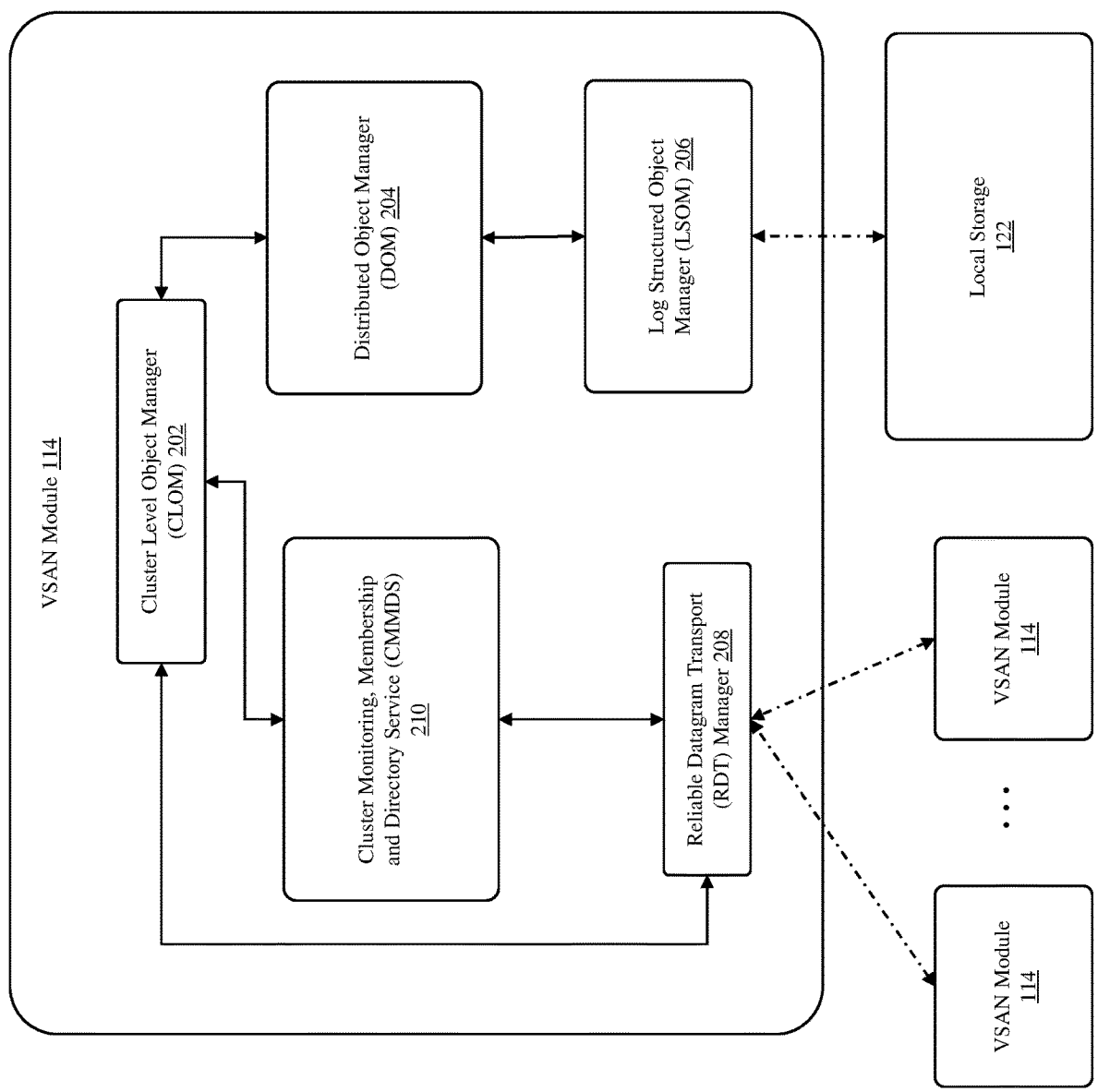
FIG. 2 is a block diagram of a virtual storage array network (VSAN) module in each host computer of the distributed storage system in accordance with an embodiment of the invention.

Turning now to FIG. 2, components of the VSAN module 114, which is included in each host computer 104 in the cluster 106, in accordance with an embodiment of the invention are shown. As shown in FIG. 2, the VSAN module includes a cluster level object manager (CLOM) 202, a distributed object manager (DOM) 204, a local log structured object management (LSOM) 206, a reliable datagram transport (RDT) manager 208, a cluster monitoring, membership and directory service (CMMDS) 210. These components of the VSAN module may be implemented as software running on each of the host computers in the cluster.

The CLOM 202 operates to validate storage resource availability, and DOM 204 operates to create components and apply configuration locally through the LSOM 206. The DOM also operates to coordinate with counterparts for component creation on other host computers 104 in the cluster 106. All subsequent reads and writes to distributed storage (DS) objects funnel through the DOM 204, which will take them to the appropriate components. The LSOM operates to monitor the flow of storage I/O operations to the local storage 122, for example, to report whether a storage resource is congested. In an embodiment, the LSOM generates a congestion signal that indicates current storage usage, such as the current tier-1 device resource fullness. The RDT manager 208 is the communication mechanism for storage I/Os in a VSAN network, and thus, can communicate with the VSAN modules in other host computers in the cluster. The RDT manager uses transmission control protocol (TCP) at the transport layer and it is responsible for creating and destroying TCP connections (sockets) on demand. The CMMDS 210 is responsible for monitoring the VSAN cluster's membership, checking heartbeats between the host computers in the cluster, and publishing updates to the cluster directory, including the status of DS objects. Other software components use the cluster directory to learn of changes in cluster topology and object configuration. For example, the DOM uses the contents of the cluster directory to determine the host computers in the cluster storing the components of a DS object and the paths by which those host computers are reachable.

Figure 3:
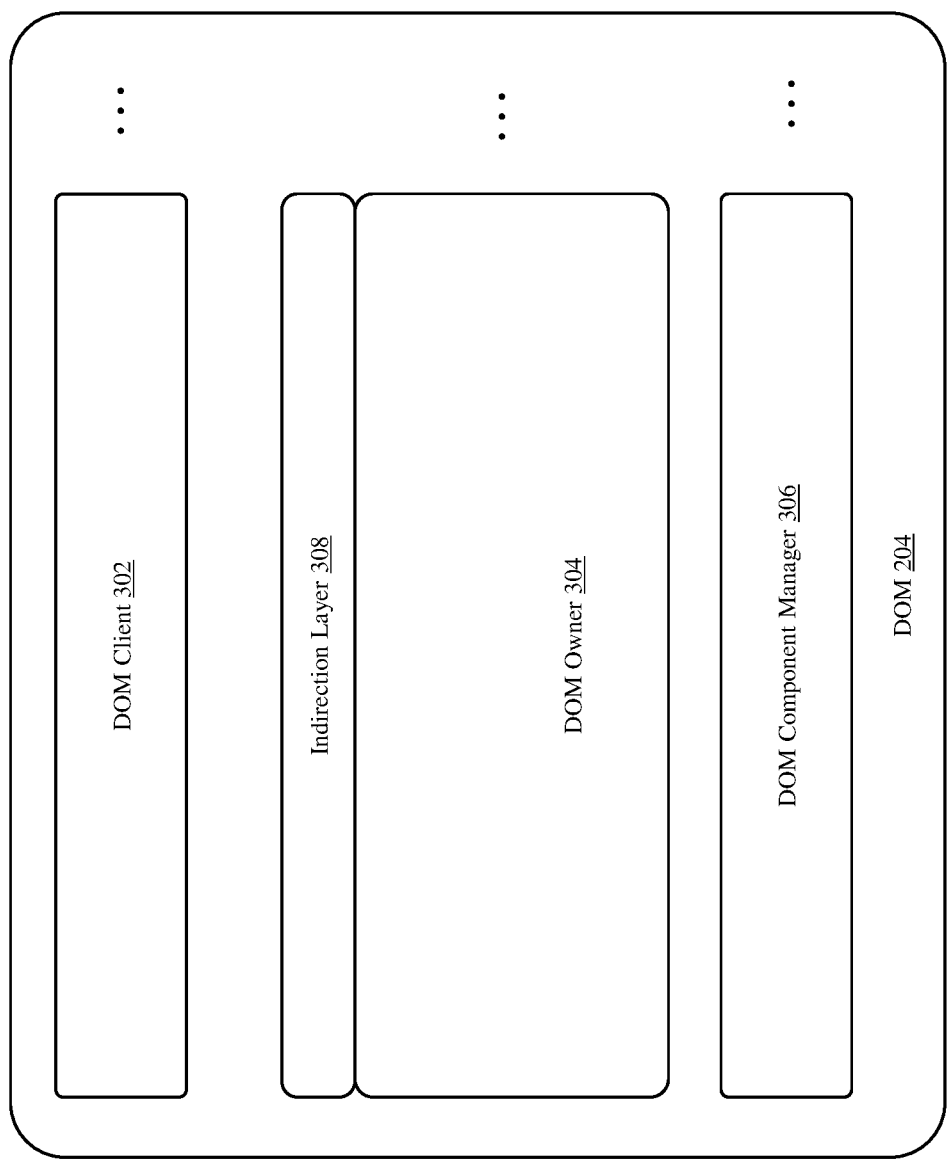
FIG. 3 is a block diagram of a distributed object owner (DOM) of the VSAN module shown in FIG. 2 in accordance with an embodiment of the invention.

Turning now to FIG. 3, components of the DOM 204 in accordance with an embodiment of the invention are shown. The DOM includes one or more DOM clients 302, one or more DOM owners 304 and one or more DOM component managers 306. Each DOM client 302 performs the input/output to a DS object on behalf of a particular virtual machine. Each DOM owner 304 manages access to a DS object, i.e., determines which processes are allowed to send I/O to the DS object. Each DS object in the distributed storage system 100 includes a DOM owner and a DOM client. The DOM owner for a DS object is responsible to handle all I/O requests to that DS object by locating the distributed components of the DS object and redirecting the I/O requests to the respective components. The DOM owner distributes data over different host computers through the DOM component manager, which is the local component of the DOM that connects with LSOM on each host computer. The DOM component managers 306 is responsible for managing DS objects on host computers where their components exist.

In the illustrated embodiment, each DOM owner 304 includes an indirection layer 308, which provide address translations. The indirection layer 308 allows for decoupling of the leader selection/election and initialization from data recovery, which are described below.

As explained above, for a DS object, when a leader of that DS object, e.g., the DOM owner 304 in a particular host computer 104 in the cluster 106, crashes or otherwise becomes unavailable, another node or host computer in the cluster is selected to take over the role of the leader, which may cause subsequent cascading secondary crashes if the cause of the original leader's unavailability is an on-disk corruption, which results in an unrecoverable error. In order to address this issue, the distributed storage system 100 uses two key mechanisms, which are crash loop detection and object pausing.

The crash loop detection mechanism uses a crash indicator in a specific on-disk block, which may be the first on-disk block recovered during a data recovery process for a leader unavailability, to detect a critically failed data recovery that has occurred in the past. At the start of any data recovery by any host computer 104 in the cluster, the crash indicator is set, which is only unset once the data recovery is completed, even if it was not successful. If this crash indicator is set, this indicates that the previous leader did not complete the data recovery, which suggests that there was likely a fatal error had occurred.

The second mechanism involves a new state of a DS object called a paused object state. For a paused object, the next leader (e.g., another host computer 104 in the cluster 106) can be elected when the current leader is unavailable but the in-memory structure of the indirection layer 308 will not be recovered, avoiding attempting to read on-disk data, or more specifically, potentially corrupted on-disk metadata. In addition, incoming user I/Os are not accepted since the user I/Os cannot be served due to the in-memory metadata not being recovered. Thus, the cascading crash loop can be averted and limit the blast radius of fatal corruption.

In an embodiment, a two-fold paused object indicator is used to mark a DS object as paused. The first element is through a distributed consensus service, e.g., the CMMDS 210, where a special entry is added marking the DS object with a specific identifier, e.g., a universally unique identifier (UUID), as paused. The second element is an on-disk paused object indicator in a particular on-disk block for the DS object that is recovered from the disk, where the presence of the on-disk paused object indicator implies that the current DS object is paused. This on-disk block may be the same on-block data that contains the crash indicator. Before recovering the rest of the on-disk data for the DS object, the presence of either of these indicators is checked by the newly elected leader. If either indicator is present, data recovery of the DS object is not executed, and the other indicator is set by the leader, setting that the DS object as paused. The reason for the two-fold mechanism is that in the case of network partition in the cluster 106, the CMMDS entry may not propagate to the next leader. In addition to network partition, the CMMDS entry may fail to be published due to transient conditions, such as out of memory. In the case that the data corruption affects the first block read, that data in the block, including the on-disk paused object indicator, may be unreliable. In addition, there is a chance the on-disk paused object indicator fails to persist due to concurrent owner migration. Thus, both mechanisms are used to make the paused state more robust in the case of network failure or data corruption. To resume the DS object, another entry is published in the CMMDS 210 marking the DS object as resumed, which will clear the paused status in the CMMDS and on-disk block next time data recovery is attempted on the DS object.

During a data recovery process due to an unavailable leader, if a previous data recovery attempt is suspected of having caused a fatal error, the DS object is automatically set as paused for predefined duration. In an embodiment, such a DS object is paused for exponentially increasing time durations, which allows the system to gracefully back off attempting recovery. In addition, a prompt may be presented to the user to manually pause the DS object, allowing the DS object to be taken offline indefinitely so that debugging can be done on the live system.

Figure 4A:
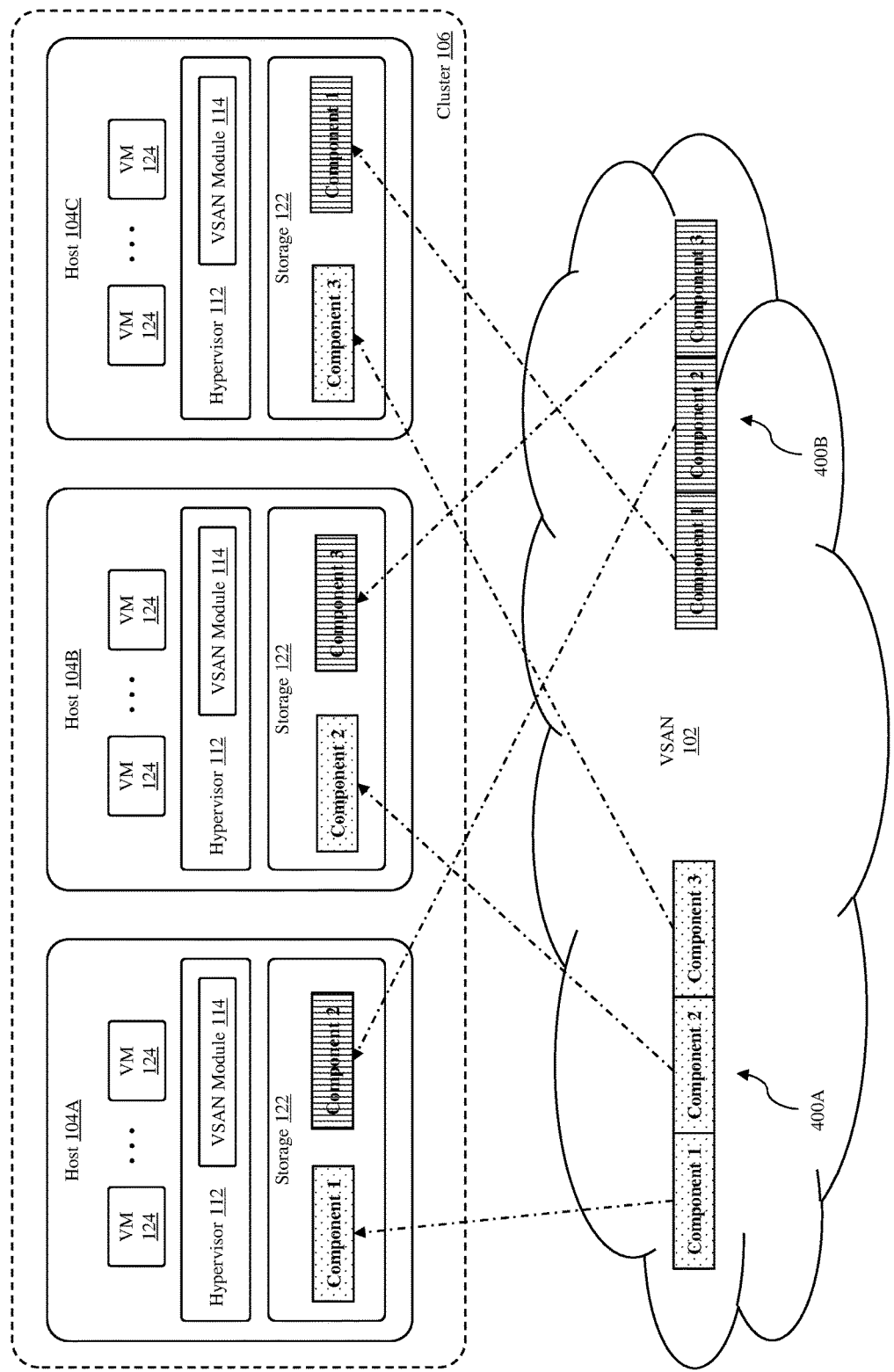
FIGS. 4A-4C illustrate a data recovery process for a distributed storage (DS) object when a leader of the DS object is unavailable in accordance with an embodiment of the invention.
Figure 4B:
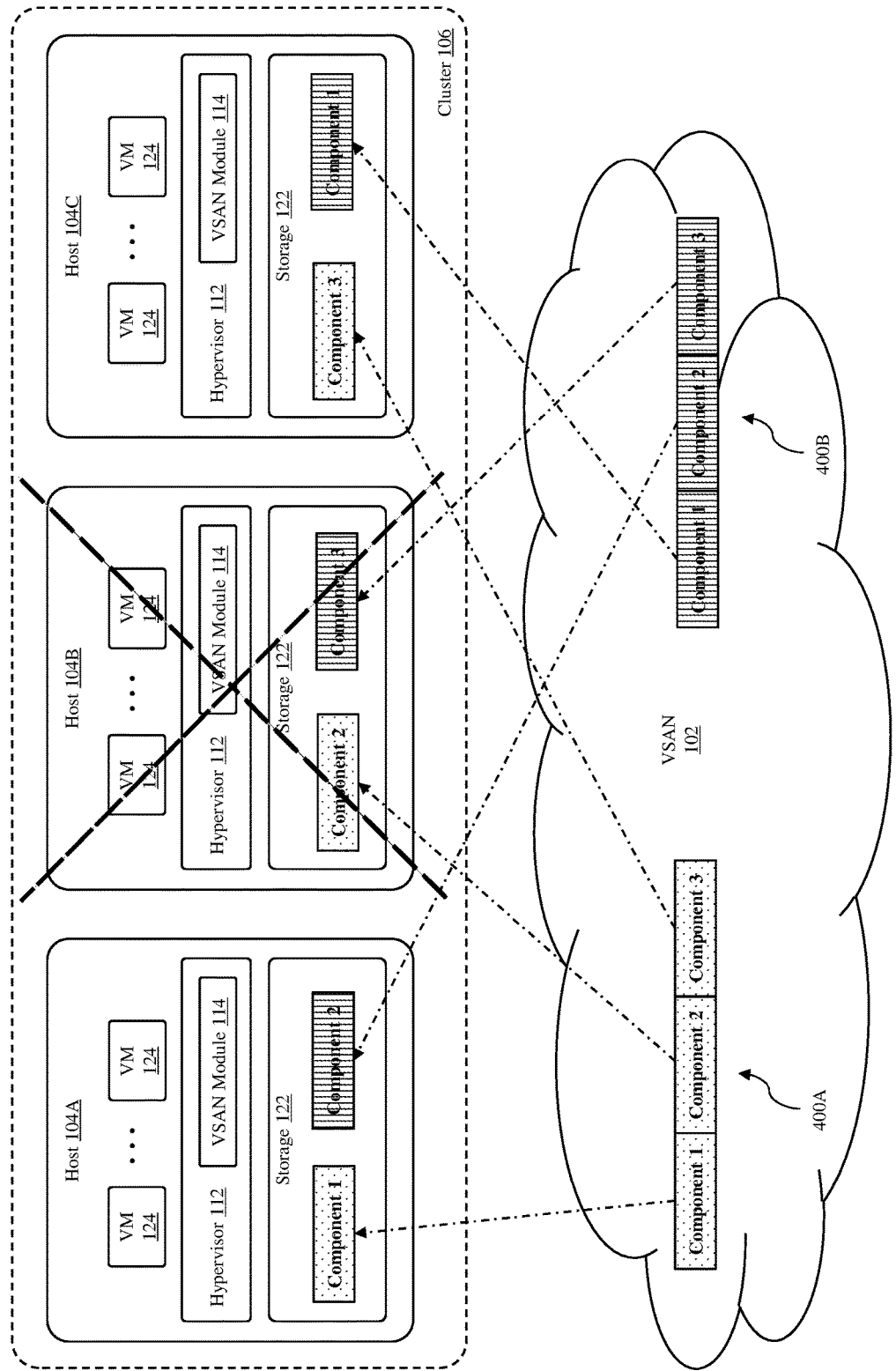
Figure 4C:
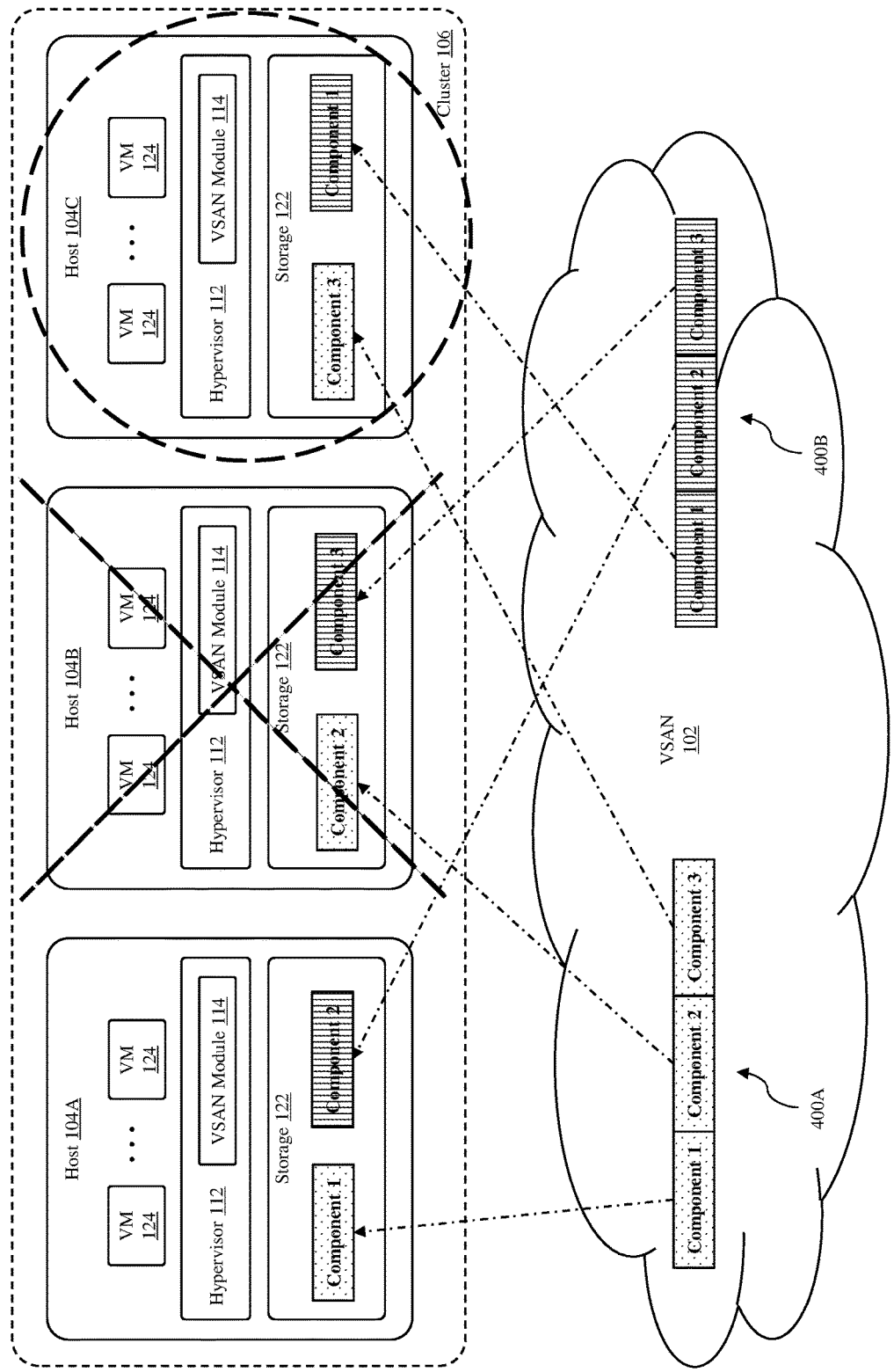

The data recovery process for a DS object when a leader of the DS object is unavailable in accordance with an embodiment of the invention is described using an example illustrated in FIGS. 4A-4C. As shown in FIG. 4A, in this example, there are three host computers ("hosts"), hosts 104A, 104B and 104C that are part of the cluster, which support and use the VSAN 102 created using the storage resources of these host computers. As illustrated, DS objects 400A and 400B are currently stored in the VSAN 102. The DS object 400A includes components 1, 2 and 3, which are distributed among the hosts in the cluster 106. Similarly, the DS object 400B includes components 1, 2 and 3, which are also distributed among the hosts in the cluster 106. Although not illustrated, there are copies or replicas of the components of the DS objects 400A and 400B, which may be stored in the hosts 104A, 104B and 104C or any other hosts in the cluster 106. In this example, the host 104B includes the leaders for both of these DS objects 400A and 400B, i.e., a DOM owner for each of the DS objects are running on the host 104B.

In an embodiment, each DS object can have several internal partitions, which consist of different sets of disks, where each partition has different replication policies. In this embodiment, user data may be stored in the partitions with erasure coding, and metadata may be stored in a single partition with replication. In either case, a failure-to-tolerate of 2 disks (FTT=2) is defined, guaranteeing both user data and metadata to be available in the case of a single failure.

If the host 104B becomes unavailable, as illustrated in FIG. 4B, another host in the cluster 106 will take over as a leader of each of the DS objects 400A and 400B and data recovery process will be initiated. An election process can be performed by the available hosts in the cluster 102, e.g., the hosts 104A and 104B, to select the leader for each of the DS objects 400A and 400B. In an embodiment, the leader election process involves each of the available hosts 104 in the cluster 106 attempting to publish an entry to the CMMDS 210 to claim leadership. The first host which updates the configuration will win the election and be recognized as the new leader. If the host 104C is elected to be the leader for the DS object 400A, as illustrated in FIG. 4C, the DOM 204 in the host 104C will execute the data recovery process.

Figure 5A:
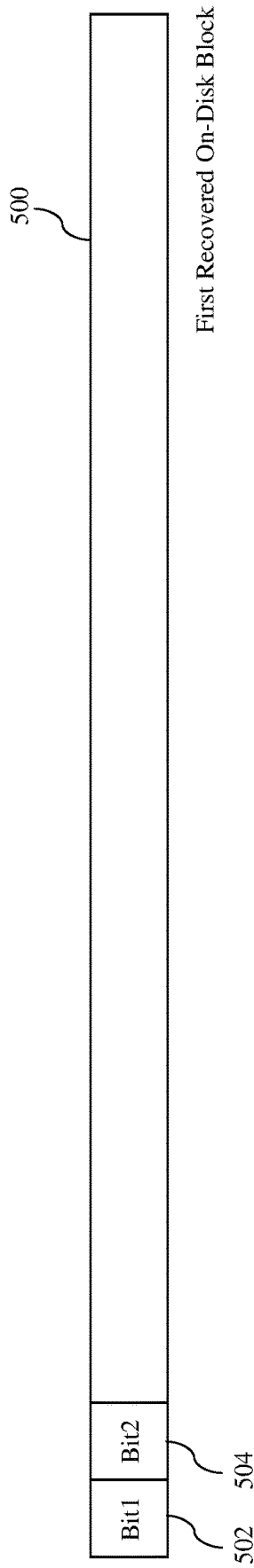
FIG. 5A illustrates a first recovered on-disk block for a DS object that includes a crash bit and an on-disk paused object bit in accordance with an embodiment of the invention.

First, the specific on-disk block for the DS object 400A is checked to determine whether the crash indicator, e.g., a single crash bit, is set. If the crash indicator is set, this indicates that a fatal error occurred when the previous leader attempted data recovery, which means that the DS object 400A should be designated as a paused object. An example of the specific on-disk block in accordance with an embodiment of the embodiment is illustrated in FIG. 5A. In this example, the first bit 502 in a first recovered on-disk block 500 is the crash indicator. Thus, if the first bit 502 is set, e.g., "1", this means that a fatal error has likely occurred when the previous leader attempted data recovery. However, if the first bit is unset, e.g., "0", this means it is not known whether fatal error has likely occurred when the previous leader attempted data recovery.

If the crash indicator is set, the two elements of the two-fold indicator are set to specify that the DS object 400A is a paused object. That is, a special entry is published in the C2MDS 210 to mark the DS object 400A as a paused object, which allows all the hosts in the cluster 106 to know that the DS object 400A is a paused object. In addition, the on-disk paused object indicator in the particular on-disk block, which may be the specific on-disk block that contains the crash indicator, is set to further indicate that the DS object 400A is paused. In an embodiment, the on-disk paused object indicator is a single on-disk paused object bit in the particular on-disk block.

Figure 5B:
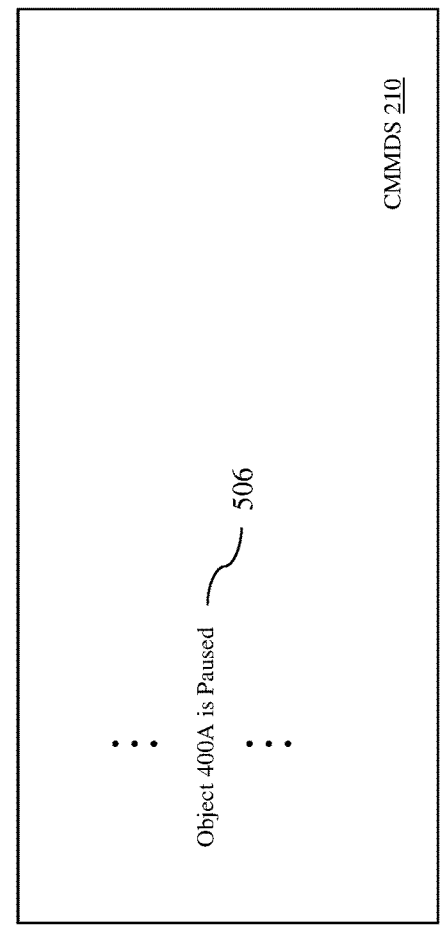
FIG. 5B illustrates a cluster monitoring, membership and directory service (CMMDS) of the VSAN module shown in FIG. 2, which includes a published entry indicating that object 400A is paused in accordance with an embodiment of the invention.

An example of the special entry that marks the DS object 400A is illustrated in FIG. 5B. As shown in FIG. 1, a special entry 506 of "Object 400A paused" published in the CMMDS 210 is illustrated in FIG. 5B. In this example, "400A" represents an identified for the DS object 400A. The special entry 506 is published along with other entries, which may include various information regarding the VSAN 102. An example of the on-disk paused object bit in accordance with an embodiment of the invention is illustrated in FIG. 5A. In this example, a second bit 504 in the first recovered on-disk block 500 is the on-disk paused object bit. Thus, if the second bit 504 is set, e.g., "1", this means that the DS object 400A is in a paused state. However, if the second bit 504 is unset, e.g., "0", this means it is not known whether that the DS object 400A is in a paused state.

If the crash indicator is unset, the two elements of the two-fold indicator are checked to see if the DS object 400A is a paused object. In both of these elements indicate that the DS object 400A is in the state of "not paused", then data recovery of the DS object 400A can be performed. In an embodiment, the data recovery of the DS object 400A involves reconstructing the object metadata from persisted logs on disk. If a leader host is lost and a new leader is elected, the state of the old leader needs to be reconstructed to serve user requests as the new leader. However, if either of these elements indicates that the DS object 400A is in the state of "paused", the other element is set as "paused" and the process comes to an end without performing data recovery for the DS object 400A. If the DS object 400A has been set as "resumed", then both of the indicators are set as "not paused" and data recovery is performed on the DS object 400A. When the data recovery begins, the crash indicator is set, which is unset when the data recovery has been completed.

In an embodiment, these steps involving the crash indicator and the two-fold paused object are performed during initialization of the new leader host. The initialization may also involve steps including, but not exclusive to, initializing internal data structures, setting up encryption keys, and acquiring memory buffers from the heap.

Figure 6:
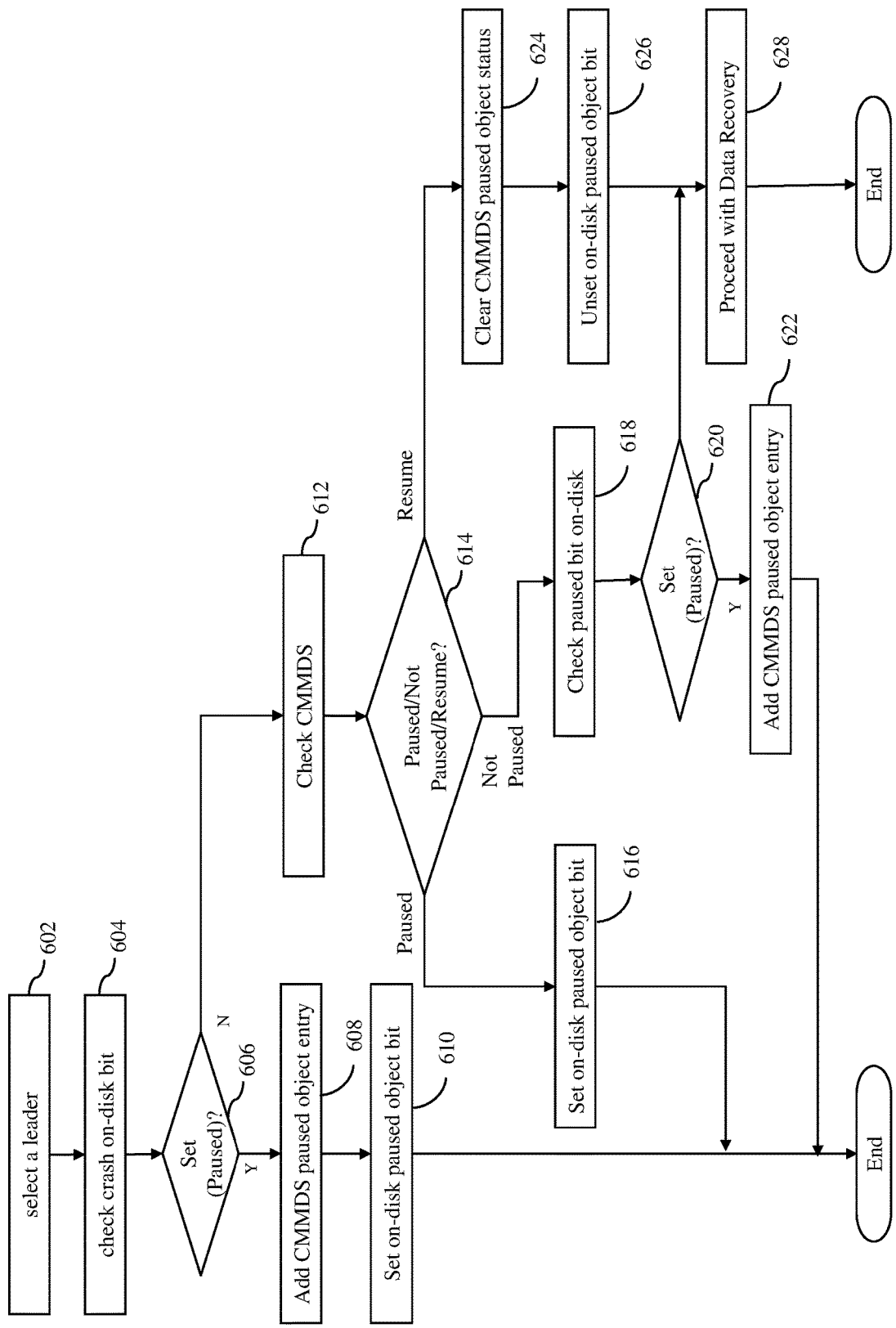
FIG. 6 is a process flow diagram of a data recovery process in the event of a leader host unavailability for a DS object in the distributed storage system in accordance with an embodiment of the invention.

A data recovery process in the event of a leader host unavailability for a DS object in the distributed storage system 100 in accordance with an embodiment of the invention is described with reference to a flow diagram of FIG. 6. The data recovery process begins at step 602, where a host 104 in the cluster 106 is elected as a new leader host for the DS object. In an embodiment, when the new leader host is elected, a new DOM owner 304, including the indirection layer 308, is instantiated in the DOM 204 of the new leader host.

Next, at step 604, the specific on-disk block 500 for the DS object is checked by the DOM 204 of the new leader host 104. At step 606, a determination is made by the DOM whether the crash indicator has been set. If the crash indicator is set, then the process proceeds to step 608, where a paused object entry is added to the CMMDS 210 by the DOM to indicate that the DS object is paused. Next, at step 610, the on-disk paused object bit in the specific on-disk block is set by the DOM to indicate that the DS object is paused. The process then comes to an end without performing data recovery for the DS object.

If it is determined that the crash bit has not been set at step 606, the process proceeds to step 612, where the CMMDS 210 is checked by the DOM 204 of the new leader host 104 for the DS object using an identifier, e.g., UUID. Next, at step 614, a determination is made by the DOM whether the current status of the distributed storage object is "paused", "not paused" or "resume". This determination is made by searching the published entries in the CMMDS 210 for the current status of the DS object. If the status of the DS object is determined to be "paused", the process proceeds to step 616, where the on-disk paused object bit in the specific on-disk block is set by the DOM to indicate that the DS object is paused. The process then comes to an end without performing the data recovery for the DS object.

If the status of the DS object is determined to be "not paused" at step 614, the process proceeds to step 618, where the on-disk paused object bit in the specific on-disk block is checked by the DOM 204 of the new leader host 104. Next, at step 620, a determination is made by the DOM whether the on-disk paused object bit has been set. If the on-disk paused object bit has been set, a paused object entry is added to the CMMDS 210 for the DS object by the DOM, at step 622, to indicate that the DS object is paused. The process then comes to an end without performing the data recovery for the DS object. However, if the pause bit has not been set, the process proceeds to step 628, where the data recovery is performed on the DS object, which includes setting the crash indicator when the data recovery is started and unsetting the crash indicator when the data recovery is done. The process then comes to an end.

If the status of the DS object is determined to be "resume" at step 614, the process proceeds to step 624, where the paused object status of the DS object in the CMMDS 210 is cleared to indicate that the DS object is not paused. Next, at step 626, the on-disk paused object bit in the particular on-disk block is unset. Next, at step 628, the data recovery is performed for the DS object, which includes setting the crash indicator when the data recovery is started and unsetting the crash indicator when the data recovery is done. The process then comes to an end.

Figure 7:
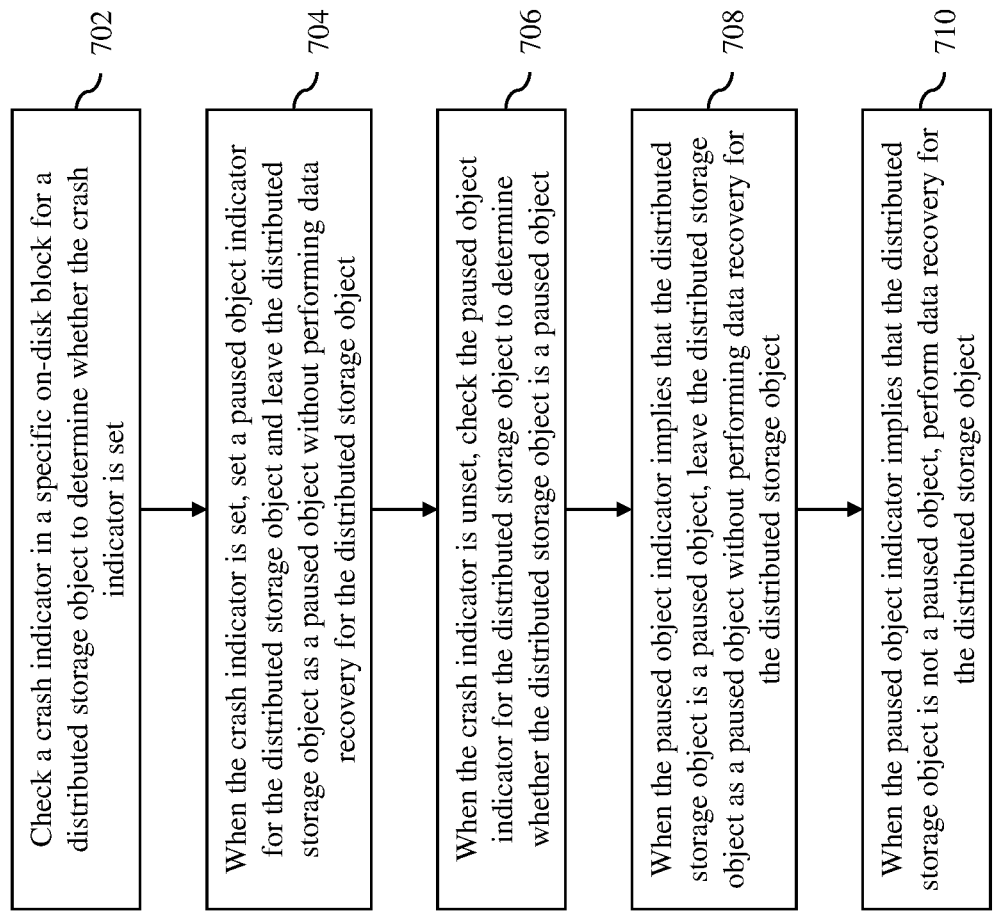
FIG. 7 is a flow diagram of a computer-implemented method of managing DS objects for host unavailability in a distributed storage system in accordance with an embodiment of the invention.

A computer-implemented method for managing distributed storage objects for host unavailability in a distributed storage system in accordance with an embodiment of the invention is described with reference to a flow diagram of FIG. 7. At block 702, a crash indicator in a specific on-disk block for a distributed storage object is checked to determine whether the crash indicator is set. At block 704, when the crash indicator is set, a paused object indicator for the distributed storage object is set and the distributed storage object is left as a paused object without performing data recovery for the distributed storage object. At block 706, when the crash indicator is unset, the paused object indicator for the distributed storage object is checked to determine whether the distributed storage object is a paused object. At block 708, when the paused object indicator implies that the distributed storage object is a paused object, the distributed storage object is left as a paused object without performing the data recovery for the distributed storage object. At block 710, when the paused object indicator implies that the distributed storage object is not a paused object, the data recovery is performed for the distributed storage object.

The components of the embodiments as generally described in this document and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, non-volatile memory, NVMe device, persistent memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for managing distributed storage objects for host unavailability in a distributed storage system, the method comprising:
   checking a crash indicator in a specific on-disk block for a distributed storage object to determine whether the crash indicator is set;
   when the crash indicator is set, setting a paused object indicator for the distributed storage object and leaving the distributed storage object as a paused object without performing data recovery for the distributed storage object;
   when the crash indicator is unset, checking the paused object indicator for the distributed storage object to determine whether the distributed storage object is a paused object;
   when the paused object indicator implies that the distributed storage object is a paused object, leaving the distributed storage object as a paused object without performing the data recovery for the distributed storage object; and
   when the paused object indicator implies that the distributed storage object is not a paused object, performing the data recovery for the distributed storage object.

2. The computer-implemented method of claim 1, wherein checking the crash indicator in the specific on-disk block for the distributed storage object includes checking a single crash bit in specific on-disk block for the distributed storage object to determine whether the single crash bit is set.

3. The computer-implemented method of claim 1, wherein checking the paused object indicator for the distributed storage object includes checking at least one of an on-disk paused object indicator and a distributed consensus service to determine whether the distributed storage object is a paused object.

4. The computer-implemented method of claim 3, wherein the on-disk paused object indicator is a single bit in the specific on-disk block for the distributed storage object.

5. The computer-implemented method of claim 3, wherein checking the paused object indicator for the distributed storage object further includes, when one of the on-disk paused object indicator and the distributed consensus service indicates that the distributed storage object is a paused object, setting the other one of the on-disk paused object indicator and the distributed consensus service to indicate that the distributed storage object is a paused object and leaving the distributed storage object as a paused object without performing the data recovery for the distributed storage object.

6. The computer-implemented method of claim 3, wherein checking the paused object indicator for the distributed storage object further includes, when both of the on-disk paused object indicator and the distributed consensus service indicate that the distributed storage object is not a paused object, performing the data recovery for the distributed storage object.

7. The computer-implemented method of claim 3, further comprising, when the distributed consensus service indicate that the distributed storage object is to be resumed, unsetting the on-disk paused object indicator to indicate that the distributed storage object is not a paused object and performing the data recovery for the distributed storage object.

8. The computer-implemented method of claim 1, wherein performing the data recovery for the distributed storage object includes setting the crash indicator when the data recovery is started and unsetting the crash indicator when the data recover is completed.

9. The computer-implemented method of claim 1, further comprising electing a new leader host for the distributed storage object in response to unavailability of a prior leader host for the distributed storage object prior to checking the crash indicator.

10. A non-transitory computer-readable storage medium containing program instructions for managing distributed storage objects for host unavailability in a distributed storage system, wherein execution of the program instructions by one or more processors of a computer system causes the one or more processors to perform steps comprising:
  checking a crash indicator in a specific on-disk block for a distributed storage object to determine whether the crash indicator is set;
  when the crash indicator is set, setting a paused object indicator for the distributed storage object and leaving the distributed storage object as a paused object without performing data recovery for the distributed storage object;
  when the crash indicator is unset, checking the paused object indicator for the distributed storage object to determine whether the distributed storage object is a paused object;
  when the paused object indicator implies that the distributed storage object is a paused object, leaving the distributed storage object as a paused object without performing the data recovery for the distributed storage object; and
  when the paused object indicator implies that the distributed storage object is not a paused object, performing the data recovery for the distributed storage object.

11. The computer-readable storage medium of claim 10, wherein checking the crash indicator in the specific on-disk block for the distributed storage object includes checking a single crash bit in specific on-disk block for the distributed storage object to determine whether the single crash bit is set.

12. The computer-readable storage medium of claim 10, wherein checking the paused object indicator for the distributed storage object includes checking at least one of an on-disk paused object indicator and a distributed consensus service to determine whether the distributed storage object is a paused object.

13. The computer-readable storage medium of claim 12, wherein the on-disk paused object indicator is a single bit in the specific on-disk block for the distributed storage object.

14. The computer-readable storage medium of claim 12, wherein checking the paused object indicator for the distributed storage object further includes, when one of the on-disk paused object indicator and the distributed consensus service indicates that the distributed storage object is a paused object, setting the other one of the on-disk paused object indicator and the distributed consensus service to indicate that the distributed storage object is a paused object and leaving the distributed storage object as a paused object without performing the data recovery for the distributed storage object.

15. The computer-readable storage medium of claim 12, wherein checking the paused object indicator for the distributed storage object further includes, when both of the on-disk paused object indicator and the distributed consensus service indicate that the distributed storage object is not a paused object, performing the data recovery for the distributed storage object.

16. The computer-readable storage medium of claim 12, further comprising, when the distributed consensus service indicate that the distributed storage object is to be resumed, unsetting the on-disk paused object indicator to indicate that the distributed storage object is not a paused object and performing the data recovery for the distributed storage object.

17. The computer-readable storage medium of claim 10, wherein performing the data recovery for the distributed storage object includes setting the crash indicator when the data recovery is started and unsetting the crash indicator when the data recover is completed.

18. The computer-readable storage medium of claim 10, wherein the steps further comprise electing a new leader host for the distributed storage object in response to unavailability of a prior leader host for the distributed storage object prior to checking the crash indicator.

19. A computer system comprising:
  memory; and
  at least one processor configured to:
    check a crash indicator in a specific on-disk block for a distributed storage object to determine whether the crash indicator is set;
    when the crash indicator is set, set a paused object indicator for the distributed storage object and leave the distributed storage object as a paused object without performing data recovery for the distributed storage object;
    when the crash indicator is unset, check the paused object indicator for the distributed storage object to determine whether the distributed storage object is a paused object;
    when the paused object indicator implies that the distributed storage object is a paused object, leave the distributed storage object as a paused object without performing the data recovery for the distributed storage object; and
    when the paused object indicator implies that the distributed storage object is not a paused object, perform the data recovery for the distributed storage object.

20. The computer system of claim 19, wherein the at least one processor is configured to check at least one of an on-disk paused object indicator and a distributed consensus service to determine whether the distributed storage object is a paused object.

* * * * *